(12) United States Patent
Zhang et al.

(10) Patent No.: US 12,327,834 B2
(45) Date of Patent: *Jun. 10, 2025

(54) CATHODE AND CATHODE MATERIALS FOR LITHIUM SULFUR BATTERIES

(71) Applicant: Navitas Systems, LLC, Ann Arbor, MI (US)

(72) Inventors: Pu Zhang, Ann Arbor, MI (US); Michael Wixom, Ann Arbor, MI (US); Qingliu Wu, Ann Arbor, MI (US)

(73) Assignee: Navitas Systems, LLC, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,150

(22) Filed: Oct. 20, 2023

(65) Prior Publication Data

US 2024/0055648 A1    Feb. 15, 2024

Related U.S. Application Data

(63) Continuation of application No. 17/360,687, filed on Jun. 28, 2021, now Pat. No. 11,830,973, which is a
(Continued)

(51) Int. Cl.
*H01M 4/36* (2006.01)
*H01M 4/04* (2006.01)
(Continued)

(52) U.S. Cl.
CPC ....... *H01M 10/052* (2013.01); *H01M 4/0402* (2013.01); *H01M 4/13* (2013.01);
(Continued)

(58) Field of Classification Search
None
See application file for complete search history.

(56) References Cited

U.S. PATENT DOCUMENTS 3,486,940 A     12/1969  Ruben
11,081,722 B2 *  8/2021  Zhang ............... H01M 4/134
(Continued)

FOREIGN PATENT DOCUMENTS

JP    H05258769 A    10/1993
JP    H10312793 A    11/1998
(Continued)

OTHER PUBLICATIONS

Dong, S., et al., Facile preparation of mesoporous titanium nitride microspheres for electrochemical energy storage, ACS Applied Materials & Interfaces, 3(1): 93-98, 2011 (Abstract only).
(Continued)

*Primary Examiner* — Lucas J. O'Donnell
(74) *Attorney, Agent, or Firm* — Weston R. Gould; Dinsmore & Shohl LLP

(57) ABSTRACT

Provided are electrode active materials with a porous structure and including a metal, that when loaded with sulfur serve as electrochemically superior cathode active materials. The metal structures are optionally used on their own, are coated with another material, or coats another porous structure such as a porous carbon structure that allows for excellent retention of both sulfur and polysulfides, are conductive themselves, and show long term stability and excellent cycle life.

9 Claims, 12 Drawing Sheets

Related U.S. Application Data continuation of application No. 15/756,384, filed as application No. PCT/US2016/050406 on Sep. 6, 2016, now Pat. No. 11,081,722.

(60) Provisional application No. 62/278,682, filed on Jan. 14, 2016, provisional application No. 62/213,777, filed on Sep. 3, 2015.

(51) Int. Cl.

| | | |
|---|---|---|
| *H01M 4/13* | (2010.01) | |
| *H01M 4/134* | (2010.01) | |
| *H01M 4/38* | (2006.01) | |
| *H01M 4/58* | (2010.01) | |
| *H01M 4/62* | (2006.01) | |
| *H01M 4/66* | (2006.01) | |
| *H01M 4/80* | (2006.01) | |
| *H01M 10/052* | (2010.01) | |
| *H01M 4/02* | (2006.01) | |

(52) U.S. Cl.
CPC ............ *H01M 4/134* (2013.01); *H01M 4/38* (2013.01); *H01M 4/5815* (2013.01); *H01M 4/624* (2013.01); *H01M 4/663* (2013.01); *H01M 4/808* (2013.01); *H01M 2004/027* (2013.01); *H01M 2004/028* (2013.01); *H01M 4/625* (2013.01)

(56) References Cited

U.S. PATENT DOCUMENTS

| | | | |
|---|---|---|---|
| 11,830,973 B2 * | 11/2023 | Zhang | ................. H01M 10/052 |
| 2011/0206992 A1 | 8/2011 | Campbell | |
| 2013/0065127 A1 | 3/2013 | Nazar et al. | |
| 2014/0193723 A1 | 7/2014 | Kumaresan et al. | |
| 2016/0013391 A1 | 5/2016 | Xiao et al. | |
| 2016/0133918 A1 | 5/2016 | Xiao et al. | |
| 2017/0012277 A1 | 1/2017 | Wang | |

FOREIGN PATENT DOCUMENTS

| | | | |
|---|---|---|---|
| JP | 2013528913 | A | 7/2013 |
| KR | 20140007128 | A | 1/2014 |
| KR | 10-1475763 | B1 | 12/2014 |

OTHER PUBLICATIONS

Zhou, X., et al., Mesoporous coaxial titanium nitride-vanadium nitride fibers of core-shell structures for high-performance supercapacitors, ACS Applied Materials & Interfaces, 3(8): 3058-3063, 2011.
Search Report for PCT/US2016/050406, dated Jun. 21, 2017.
Extended European Search Report for Application No. 16869020.4 dated Dec. 20, 2018.
Jun, Y., et al., Mesoporous, 2D Hexagonal Carbon Nitride and Titanium Nitride/Carbon Composites, Adv. Mater., 21: 4270-4274, 2009.
JP2013528913A English translation, 2013.
Fischer, A., Synthesis of Ternary Metal Nitride Nanoparticles Using Mesoporous Carbon Nitride as Reactive Template, ACS Nano, 2(12): 2489-2496, Nov. 12, 2008.

\* cited by examiner

CATHODE AND CATHODE MATERIALS FOR LITHIUM SULFUR BATTERIES

CROSS REFERENCE TO RELATED APPLICATIONS

This application is a continuation of U.S. patent application Ser. No. 17/360,687 filed Jun. 28, 2021, which is a continuation of U.S. patent application Ser. No. 15/756,384 (now U.S. Pat. No. 11,081,722), which is a U.S. National Stage under 35 U.S.C. § 371 of Application No: PCT/US2016/050406 filed Sep. 6, 2016, which depends from and claims priority to U.S. Provisional Application No. 62/213,777 filed Sep. 3, 2015 and U.S. Provisional Application No. 62/278,682 filed Jan. 14, 2016 the entire contents of each of which are incorporated herein by reference.

STATEMENT OF GOVERNMENT SUPPORT

This disclosure was made with government support under the United States Navy SBIR program under contract # N68335-16-00017. The government has certain rights in the disclosure.

FIELD

The invention relates to secondary batteries. More specifically, the invention relates to electrodes for lithium sulfur batteries and in particular cathodes and cathode materials for lithium sulfur batteries.

BACKGROUND

The promise of low cost and high capacity has made the lithium sulfur battery (LSB) a leading candidate for future lithium ion batteries used in vehicle energy storage. The LSB theoretically delivers specific energy of 2600 Wh/kg, which is 3-5 times higher than present state-of-the-art lithium-ion batteries. Practical application of lithium sulfur batteries, however, remains limited by low utilization of sulfur and by fast capacity fading of sulfur cathodes. The root causes of these limitations are poor electronic conductivity of the cathode combined with high solubility of intermediate lithium-polysulfide products that form during the charge/discharge processes. Poor electronic conductivity is due both to low intrinsic conductivity of sulfur as well as to volumetric changes that degrade electronic connectivity in the cathode.

The keys to longer cycle life lie in improving the cathode conductivity and isolating sulfur and sulfides to the cathode [Manthiram 2013, 2014; Yang 2013]. The strategy of encapsulating sulfur within a conductive host matrix has emerged as an effective strategy to improve LSB performance. However, the sulfur-encapsulation approaches reported to date effectively trap non-polar sulfur, but not the polar polysulfide intermediates that form during discharge. This leaves polysulfide species free to dissolve and be transported to the anode where they undergo parasitic reaction resulting in the depletion of the anode.

It should also be noted that the promising electrochemical performance reported for most Li-sulfur batteries were obtained at low rates (<1 C), with dramatic capacity drop observed at higher rates. The poor rate capability of Li-sulfur batteries is associated with the intrinsic insulating property of sulfur and polysulfides. Sulfur and its lithiated compounds have poor electric conductivity ($5\times10^{-30}$ S·cm$^{-1}$ for sulfur at 25° C.), which makes it hard to accept electrons from the current collector, even though a conducting agent may be added. Besides low electrical conductivity due to insoluble sulfur and sulfides, soluble polysulfides may form and diffuse through separator resulting in a shuttle reaction that can lead to undesired self-discharge and heating in the cell.

Carbon as a conductive host matrix in the form of the mesoporous carbon cathodes developed by Nazar et al [Ji 2009] represented a breakthrough in LSB performance and cycle life. Following this work, a wide range of carbon host materials have been investigated, including microporous spheres [Zhang 2010], mesoporous nanoparticles [Schuster 2012], porous hollow carbon [Jayaprakash 2012], graphene oxide sheets [Ji, L. 2011], porous carbon nanofiber [Ji, L. W. 2011], and hollow carbon fibers [Zheng 2011]. The carbon material hosts sulfur, but has limited interaction with sulfur intermediate species, especially polysulfides, which may dissolve into the bulk electrolyte during cycling. This has prompted efforts to modify the carbon host to enhance the interaction with intermediate species, among which nitrogen doped porous carbon or graphene composites have shown some promising results through the electronegative nature of N [Song 2014; Qiu, 2014]. However, low dopant content and processing challenges are limiting application on a practical scale.

As an alternative, conductive polymers such as polyaniline (PANi) [Zhang 2014], polypyrrole (PPY) [Fu and Manthiram 2012], and polythiophene (PT) [Wu, F. 2011] have also been reported to confine sulfur and polysulfides with the help of oxygen containing functional groups and chain structures. Thus far, the low conductivity (comparing to carbon) and long term stability are two short-comings for this type of material.

Metal oxides are attractive materials for trapping the sulfur and polysulfides in the cathode [Song 2004]. Recently, the combination of mesoporous carbon and mesoporous $TiO_2$ has been reported as a sulfur cathode [Evers 2012]. Mesoporous titania was effective at retaining both sulfur and polysulfides. Since the metal oxides are not conductive, however, they can only be used as additives at low percentages, which significantly limits their effectiveness.

As such, new materials and structures are needed for use in lithium ion batteries.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are materials capable of sufficiently accommodating sulfur volume change during cycling; possess excellent mechanical strength and conductivity so as to enable high utilization of sulfur; and have high affinity to both sulfur and polysulfides to thereby minimize sulfur dissolution and their incorporation into electrodes. Such a materials are provided in several aspects as presented herein. In some aspects, an electrochemically active material is provided that includes a porous structure including a metal, optionally a nitride or oxynitride of the metal comprising a structure formed by heating the metal under anhydrous $NH_3$ gas flow, the structure optionally infiltrated with sulfur or otherwise contacting sulfur. The material may also include one or more electrically conductive fillers, a binder, or both. In some aspect, the structure has a porosity of 20% or greater, optionally 50% or greater. Optionally, the structure has a surface area of 50 m$^2$/g or greater, optionally 150 m$^2$/g or greater. The metal is optionally Ti, Si, Cr, Fe, V, Mo, W, Zr, Co, Ni, Nb, or combinations thereof. Optionally, in the formation of an electrode, a sulfur impregnated structure optionally is combined with a binder. A binder is optionally polytetrafluoroethylene, polyvinylidene difluoride, latex binder, carboxymethylcellulose, poly(acrylic acid), polyvinyl alcohol, or combinations thereof. In some aspects, a structure is combined with an electrically conductive filler, optionally including carbon, optionally intermixed with the filler.

In some aspects, the electrically conductive metal nitride or metal oxynitride materials coat an underlying porous structure or is itself coated with another material, or both. In some aspects the metal is coated onto the surface of a porous scaffold material. The porous scaffold material is optionally formed at least in part with carbon. In some aspects, a porous scaffold material is in the form of a microporous sphere, mesoporous nanoparticle, porous hollow carbon, graphene oxide sheet, porous carbon nanofiber, hollow carbon fiber, metal foam, metal mesh, or combinations thereof, optionally the porous scaffold material is comprises carbon, graphene, graphene oxide, metal and combinations thereof.

Also provided are metal, optionally, metal nitride or metal oxynitride, materials that themselves serve as a core which is then coated with a coating material that includes a metal that differs from the core. Optionally, the core includes titanium nitride or oxynitride. Optionally, the coating includes vanadium. The coated metal optionally itself coats a porous substrate such as a porous carbon substrate as described herein.

The electrochemically active materials may be used in electrodes, optionally a cathode, for a lithium sulfur cell.

DETAILED DESCRIPTION

Figure 1:
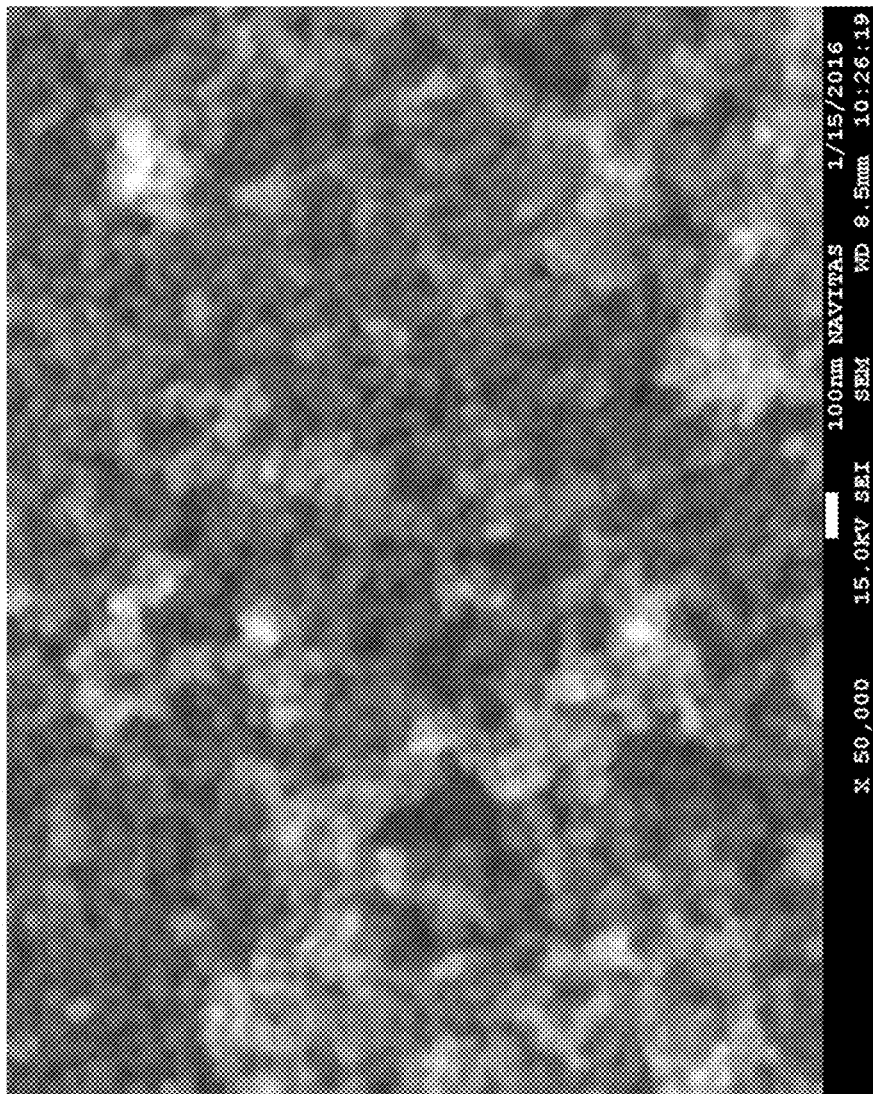
FIG. 1 illustrates a scanning electron microscope image of a TiN structure according to some aspects.

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Provided are new electrochemically active materials that improve the utilization of sulfur and reduce capacity fading of sulfur cathodes relative to prior systems. The materials have utility optionally in a cathode of secondary batteries. The electrochemically active materials include a porous conductive metal, optionally metal nitride or oxynitride, material that in some aspects serves as a host for sulfur and functions to provide high affinity to both non-polar sulfur and polar polysulfides. Advanced performance of this LSB cathode material is expected for three reasons: (1) porous structure will accommodate sulfur volume change during cycling; (2) mechanical strength and conductivity will enable high utilization of sulfur; and (3) high affinity to both sulfur and polysulfides will minimize sulfur dissolution.

A conductive, porous ceramic host is optionally formed through nitriding a highly porous metal oxide precursor. The metal oxide precursor optionally includes a metal oxide optionally selected from materials that are generally compatible with materials typically used in the manufacture of batteries. Suitable exemplary metal oxides include an oxide of group II-V elements, Ti, Ta, Cr, Fe, Hf, Si, B, V, Mo, W, Zr, Co, Ni, Nb or combinations thereof, illustratively $SiO_2$, $B_2O_3$, $ZrO_2$, $CoO_2$, NiO, $TiO_2$, $B_2O_3$, $V_2O_5$, $MoO_2$, or $WO_3$. The oxide precursor structure optionally follows closely on structures such as porous $SiO_2$ or $TiO_2$. These structures may be produced using low cost precursors and scalable processes, and are compatible with high volume electrode fabrication processes.

To synthesize TiN, for example, a porous $TiO_2$ powder precursor may be heat treated under anhydrous $NH_3$ gas flow. The porous $TiO_2$ powder is placed inside a tubular furnace (Lind Berg/Blue) with flowing $NH_3$ gas. The conversion is conducted at a temperature of 800~1000° C. for 1~4 hours. To preserve the porous structure and ensure the conversion, the heat rate, reaction temperature and time are well controlled and optimized.

In some aspects, oxide precursors are modified with an additive, optionally an organic additive, prior to the nitriding process. The inclusion of such additives may serve to protect the underlying porous structure during the subsequent high temperature reduction/nitridation. Also, such additives may serve to mitigate particle growth. Exemplary organic additives include those capable of nitride formation themselves but are also decomposable at temperatures under which the underlying metal of the precursor is reduced/nitrided thereby leaving a clean surface of metal, optionally metal nitride or oxynitride, and may be described herein as a nitriding agent. Illustrative examples include additives that are capable of forming carbon nitride structures. Specific illustrative examples of additives include but are not limited to cyanamide, dicyandiamide, cyanuric triazide, or melamine. Cyanamide, as one example, has advantages of being soluble in both organic solvents such as ethanol and water thereby promoting ease of use in many nitriding systems. Additionally, cyanamide may be condensed into carbon nitride at temperatures below 550° C. which will successfully promote carbon nitride formation and prevent sintering of the titanium dioxide. When the process temperature is raised above 650° C. the carbon nitride will decompose leaving a pure metal nitride or metal oxynitride porous material.

As an exemplary aspect to synthesize TiN, as-received anatase $TiO_2$ precursor (Cristal) is stirred at room temperature in 5 weight percent solution of cyanamide in ethanol, and dried at 80° C. In a subsequent thermal step just above 500° C. for 0.5 to 3 hours depending on the thickness of the coated additive, the additive is decomposed to leave a rigid carbon nitride framework that inhibits sintering. Upon raising the temperature further to just above 650° C. for an appropriate time depending on the thickness of the additive coating, the carbon nitride framework thermally decomposes and is volatilized at the completion of the nitridation operation leaving clean TiN.

The nitridation reaction conditions (ramp rate, temperature, reducing gas composition and flow rates) were identified for the modified $TiO_2$. For the optimized process, the precursor was placed inside the tubular furnace, and then heated under ammonia. Prior to heating, the system is purged with argon and then with $NH_3$. The resulting nitride parameters are illustrated in Table 1.

TABLE 1

Properties of an illustrative porous metal nitride structure formed from titanium oxide.

| Property | Parameter |
| --- | --- |
| Structure | Fcc |
| Space group | Fm-3m |
| Surface area | >150 $m^2/g$ |
| Pore size | 2-20 nm |
| Porosity | >50% |
| Primary particle size | 5-10 nm |
| Secondary particle size | 1-5 μm |
| Electrical conductivity | >$10^4$ S/cm |
| Purity | >99.0% |

In some aspects, an electrochemically active material is formed through processes that include atomic layer deposition (ALD) to produce layers of metal on a porous substrate such as a $TiO_2$ powdered substrate. ALD is a high-quality thin-film deposition technique based on sequential, self-limiting surface reactions. In ALD a substrate is sequentially exposed to two or more reactant vapors while maintaining the substrate temperature within a temperature range favorable to the desired ALD reaction. A typical ALD process involves two sequential surface reactions involving two different reactants referred to herein as A and B. The ALD system may be purged of reactant gas between the A and B reactions with a non-reactive purge gas. The AB reaction sequence forms a very thin layer of material, e.g., as little as one atomic layer, or a partial atomic monolayer, on the walls of the pores.

ALD produces a high-quality thin-film layer of material, e.g., as little as one layer, or a partial deposition of conformal films on structures having very high aspect ratios (e.g., >100). When the gaps or pores to be coated are larger than the ALD reactant gas molecules, the reactant gases can diffuse into the spaces. A wide variety of materials may be deposited by ALD, including semiconductors, metals, oxides, nitrides, and other materials. Illustratively, the ALD process may be used to deposit metal illustratively metals of group II-V elements, Ti, Ta, Hf, Si, B, V, Mo, W, Zr, Co, Ni, Nb or combinations thereof, or art recognized precursors thereof to produce an oxide coating illustratively of $SiO_2$, $B_2O_3$, $ZrO_2$, $CoO_2$, NiO, $TiO_2$, $B_2O_3$, $V_2O_5$, $MoO_2$, or $WO_3$. ALD techniques can thus deposit thin films one layer at a time, in a "digital" fashion. The thickness of the ALD deposited film depends on the number of repetitions of the ALD processes.

As an exemplary aspect, a vanadium precursor (vanadium oxytriisopropoxide; Sigma-Aldrich, St. Louis, MO) is coated on the surface of porous $TiO_2$ powder (Sigma) by an ALD processes. Volatile vanadium-based precursors enable use of ALD processing to fully access surfaces of a porous material, producing a conformal thin film. The ALD process results in the formation of a $V_nO_x$ (where n is from 1 to 8 and x is 1 to 15) layer on the porous $TiO_2$ substrate. The thickness of $VO_x$ layer is controlled and optimized through controlling the cycle number of ALD.

The $TiO_2$ powder coated with vanadium oxides ($TiO_2$—$VO_x$) precursor is heat treated under anhydrous $NH_3$ gas flow to electrochemically reduce at least the surface layer on the powder. The reduced surface layer composition would be vanadium and/or titanium sub-oxides, oxynitrides or nitrides, depending on the extent of the reduction process. The reduction process significantly increases the electronic conductivity of the powder, while also producing a mixture of V and Ti-based sites with affinity for sulfur and sulfide species. The porous $TiO_2$—$VO_x$ powder is placed inside a tubular furnace (Lind Berg/Blue) with flowing $NH_3$ gas. The conversion is conducted at a temperature of 450~1000° C. for 1~4 hours. The reduction process is optionally performed at conditions that avoid destroying the powder precursor. To preserve the porous structure and ensure the conversion, the heat rate, reaction temperature and time are well controlled and optimized. The reduction and nitridation of vanadium is known to occur well below the reduction and nitridation of titanium and may be expected to occur below 600° C. at which the porous structure $TiO_2$ host is very stable. The final product possesses a core-shell structure with VN as shell and TiN—$TiO_x$ as core. The resulting nitride parameters are illustrated in Table 2.

TABLE 2

Properties of an illustrative porous metal nitride structure formed from titanium oxide.

| Property | Parameter |
|---|---|
| Composition | $TiO_x$—TiN—VN |
| Surface area | >150 m²/g |
| Pore size | 2-20 nm |
| Porosity | >50% |
| Primary particle size | 5-10 nm |
| Secondary particle size | 1-5 μm |
| Electrical conductivity | >$10^4$ S/cm |
| Purity | >99.0% |

Similar results may be obtained using other metal precursors to coat a porous substrate by ALD or other deposition processes followed by reduction and nitridation of the resulting materials.

A metal, optionally metal nitride or oxynitride, coating may be formed on other types of porous substrates, optionally with a porosity of 20% to 80%. Such configurations will result in lower bulk density as the same number of sulfur atoms is able to be included in the material relative to metal nitride or metal oxynitride material. This allows for an overall lighter cell and higher energy density. Illustrative examples of porous substrates include porous carbon powder, porous carbon cloth, carbon paper, metal foams, metal meshes, among others. Illustrative examples of such porous substrates include but are not limited to porous carbon powder available from Heraeus, or a carbon cloth obtainable from Fuel Cells Etc optionally with the porosity in the range of 31%-80%. Other illustrative examples include microporous spheres [Zhang 2010], mesoporous nanoparticles [Schuster 2012], porous hollow carbon [Jayaprakash 2012], graphene oxide sheets [Ji, L. 2011], porous carbon nanofiber [Ji, L. W. 2011], and hollow carbon fibers [Zheng 2011]. Depositing one or more metal oxides onto the porous substrate may be performed by several approaches including but not limited to atomic layer deposition (ALD), chemical vapor deposition (CVD), physical vapor deposition (PVD), and other thin film deposition methods. A metal oxide coating can be deposited on a porous substrate by any of the thin film deposition method followed by reduction and nitridation of the oxide coating. Alternatively, a metal nitride or oxynitride coating can be directly formed on a porous substrate during the deposition processes such as using the process of ALD.

As an exemplary aspect of forming a porous material including an outer layer of metal nitride or metal oxynitride, a layer of $TiO_2$ thin film is coated on the surface of porous carbon powder via an ALD process. Initially, porous carbon powder is heated inside an ALD reactor in a $N_2$ atmosphere. The ALD cycle may include of a pulse (e.g. 2 seconds) of titanium precursor (titanium ethoxide; Sigma-Aldrich), followed by a pulse (e.g. 2 seconds) of water to deposit $TiO_2$ on the porous carbon powder. An $N_2$ purge is introduced between the precursor pulses to remove the excess precursors and the reaction by-products. The thickness of $TiO_2$ layer is controlled and optimized through controlling the cycle number of ALD. In some aspects that thickness of the $TiO_2$ layer is 0.5 nanometers (nm) to 3 nm, or any value or range therebetween. In some aspects, the thickness is less than 0.5 nm. In other aspects the thickness is greater than 3 nm. The $TiO_2$-porous carbon powder is placed inside a tubular furnace (Lind Berg/Blue) with flowing $NH_3$ gas. The nitridation of the oxide layer is conducted at a temperature of 450~1000° C. for 1~4 hours.

As another exemplary aspect of directly depositing a metal, optionally metal nitride or metal oxynitride, layer onto a porous substrate, a layer of TiN thin film is coated on the surface of porous carbon powder via an ALD process. Initially, porous carbon powder is heated up inside ALD reactor in $N_2$ ambient. The ALD cycle may include of a pulse of titanium precursor (titanium tetrachloride; Sigma-Aldrich), followed by a pulse of $NH_3$ is employed to deposit TiN on porous carbon powder. An $N_2$ purge is introduced between the precursor pulses to remove the excess precursors and the reaction by-products. The thickness of TiN layer is controlled and optimized through controlling the cycle number of ALD. The final product possesses a porous carbon with surface covered by a uniform TiN film. Exemplary resulting TiN-porous carbon parameters formed in this way are illustrated in Table 3.

TABLE 3

Properties of an illustrative porous carbon (Porocarb HD3, Heraeus, Hanau, Germany) coated with metal nitride structure.

| Property | Parameter |
|---|---|
| Composition | C—TiN |
| Thickness of TiN | 0.1-10 nm |
| Pore size | 2-50 nm |

Similar results may be obtained using other metal oxides, metal nitrides, or metal oxynitrides to coat a porous substrate(s) optionally followed by reduction and nitridation of the resulting materials. Theoretical comparative properties of a titanium nitride material and a titanium nitride coated porous carbon material are illustrated in Table 4 under conditions where each is packed with sulfur and tested against a lithium counter electrode.

TABLE 4

| | Baseline of Example 1 TiN | Porous carbon coated with TiN |
|---|---|---|
| Bulk Density (g/cc) | 5.2 | 2.4 |
| Active Material (wt. %) | 50 | 70 |
| Cell Voltage (V) | 2.15 | 2.15 |

TABLE 4-continued

|  | Baseline of Example 1 TiN | Porous carbon coated with TiN |
|---|---|---|
| Cell Capacity (Ah) | 2.15 | 2.15 |
| Specific Energy (Wh/kg) | 273 | 300 |
| Energy Density (Wh/L) | 496 | 512 |

The resulting porous metal, optionally metal nitride or metal oxynitride, structure has a porosity of 20% or greater. As porosity may be expressed as a volume ratio, it is a unitless number typically presented as a percent. In some aspects, a porosity is from 20% to 80%, or any value or range therebetween. A porosity is optionally greater than 60%, optionally greater than 80%. A porosity is optionally at or greater than 20%, at or greater than 25%, at or greater than 30%, at or greater than 35%, at or greater than 40%, greater than 45%, at or greater than 50%, at or at or greater than 55%, at or greater than 60%, at or greater than 70%, at or greater than 75%, or at or greater than 80%.

The resulting porous metal, optionally metal nitride or metal oxynitride, structure has a specific surface area. A specific surface area is defined as the total surface area of a material per unit of mass. The specific surface area of the porous metal nitride or metal oxynitride structure is optionally at or greater than 50 m$^2$/g. The specific surface area of the porous metal nitride or metal oxynitride structure in some aspects is optionally at or greater than 60 m$^2$/g, optionally at or greater than 70 m$^2$/g, optionally at or greater than 80 m$^2$/g, optionally at or greater than 90 m$^2$/g, optionally at or greater than 100 m$^2$/g, optionally at or greater than 110 m$^2$/g, optionally at or greater than 120 m$^2$/g, optionally at or greater than 130 m$^2$/g, optionally at or greater than 140 m$^2$/g, optionally at or greater than 150 m$^2$/g, optionally at or greater than 160 m$^2$/g, optionally at or greater than 170 m$^2$/g, optionally at or greater than 200 m$^2$/g, optionally at or greater than 300 m$^2$/g, optionally at or greater than 400 m$^2$/g, optionally at or greater than 500 m$^2$/g, optionally at or greater than 600 m$^2$/g, optionally at or greater than 700 m$^2$/g, optionally at or greater than 800 m$^2$/g, optionally at or greater than 900 m$^2$/g, optionally at or greater than 1000 m$^2$/g, optionally at or greater than 1500 m$^2$/g, optionally at or greater than 2000 m$^2$/g, optionally at or greater than 2500 m$^2$/g. Optionally, the specific surface area of the porous metal nitride or metal oxynitride structure is from 50 m$^2$/g to 2500 m$^2$/g, or any value or range there between. Optionally, the specific surface area of the porous metal nitride or metal oxynitride structure is from 50 m$^2$/g to 150 m$^2$/g, or any value or range there between. As a non-liming example Schuster, et al., *Angew. Chem. Int. Ed.* 2012; 51:3591-3595 teach mesoporous carbon nanoparticles with a surface area of 2445 m$^2$/g that can act as a porous substrate for depositing a metal nitride or metal oxynitride layer onto. Zhang et al., *Energy Environ. Sci.*, 2010; 3:1531-1537 teach microporous carbon spheres with a porosity of 843.5 m$^2$/g that can also serve as a porous substrate for depositing a metal, optionally metal nitride or metal oxynitride, layer onto. Other carbon sources as described in the references cited herein and as otherwise known in the art can also serve as porous substrates for the herein provided coating.

The metal, optionally metal nitride or metal oxynitride, may then be combined with sulfur to form an electrochemically active material suitable for use in a lithium sulfur electrochemical cell. The sulfur active material is optionally elemental sulfur (elemental sulfur, S$_8$ (e.g. sublimed sulfur (Fuchen Chemical, Tianjin)), a sulfur-based compound (optionally Li$_2$S or other suitable sulfur source), or a mixture thereof. Illustrative examples of a sulfur-based compound include but are not limited to Li$_2$S$_n$ (n=1), organic sulfur compounds, and a carbon-sulfur polymers. The amount of sulfur loading into the substrate is optionally in the range of 30 weight percent to 80 weight percent, or any value or range therebetween, optionally 40 weight percent to 80 weight percent.

An electrochemically active material that includes a metal, optionally metal nitride or metal oxynitride, is optionally combined with an electrically conductive filler. An exemplary conductive filler optionally includes carbon. Carbon materials suitable for use in batteries as are recognized in the art may be used. Illustrative examples of carbon materials include carbon black, carbon nanotube, synthetic graphite including expanded graphite, graphite nanosheets, graphite nanoplatelet, graphene sheets, non-synthetic graphite (including natural graphite and coke) and graphitized carbon nano-fibers. An electrochemically conductive filling is optionally used at a weight percent of 5 to 30, or any value or range therebetween, optionally a weight percent of 10 to 30, optionally 10 to 25, optionally 15 to 25. In some aspects, an electrically conductive filler is absent.

An electrochemically active material that includes a metal, optionally metal nitride or metal oxynitride, is optionally combined with a binder. A binder optionally includes polyvinylidene difluoride (PVdF), polytetrafluoroethylene (PFTE), latex polymer or co-polymer, carboxymethyl cellulose (CMC), polyacrylic acid (PAA), polyvinyl alcohol (PVA), or combinations thereof. In some aspects a binder is absent. Optionally, a binder is present at a weight percent of 0 to 20, optionally 5 to 15.

An electrochemically active material that includes a metal, optionally metal nitride or metal oxynitride, is optionally coated onto an electrically conductive substrate. When associated with a substrate, the substrate is optionally formed of any suitable electrically conductive and impermeable or substantially impermeable material, including, but not limited to, copper, stainless steel, titanium, or carbon papers/films, a non-perforated metal foil, aluminum foil, cladding material including nickel and aluminum, cladding material including copper and aluminum, nickel plated steel, nickel plated copper, nickel plated aluminum, gold, silver, any other suitable electronically conductive and impermeable material or any suitable combination thereof. In some aspects, substrates may be formed of one or more suitable metals or combination of metals (e.g., alloys, solid solutions, plated metals). Optionally, an electrochemically active material that includes a metal nitride or metal oxynitride is not associated with a substrate.

An electrochemical cell is also provided that uses an electrode formed of an electrochemically active material that includes a metal, optionally metal nitride or metal oxynitride, substantially as provided by herein with aspects as described herein.

An electrochemical cell optionally includes an anode comprising an anode active material. In some aspects, an anode active material optionally includes silicon, graphitic carbon, silicon carbon composites, tin, Ge, Sb, Al, Bi, As, Li metal, lithium alloys, metal alloys, transition metal oxides, nitride materials, sulfide materials, and combinations thereof. Illustrative examples of a metal alloy for use as an anode active material include silicon alloys. In some aspects, an anode includes lithium metal, lithium ions, and/or one or more lithium alloys such as lithium aluminum alloys, lithium silicon alloys, and lithium tin alloys. Additional materials suitable for anode include lithium carbon, Li—Sn$_2$O$_3$, and Li—SnO$_2$ based materials. The materials may be in various forms, such as foils or pressed-powder sheets. The anode may also include an embedded current collector.

An electrochemical cell includes an electrolyte. An electrolyte is optionally a solid or fluid electrolyte. Illustratively, the electrolyte includes a lithium salt and a non-aqueous organic solvent. A lithium salt is optionally LiPF$_6$, LiBF$_4$, LiSbF$_6$, LiAsF$_6$, LiN(SO$_2$C$_2$F$_5$)$_2$, Li(CF$_3$SO$_2$)$_2$N, LiN (SO$_3$C$_2$F$_5$)$_2$, LiC$_4$F$_9$SO$_3$, LiClO$_4$, LiAlO$_2$, LiAlCl$_4$, LiCl, LiI, or LiB(C$_2$O$_4$)$_2$ (lithium bis(oxalato) borate; LiBOB), bis-(trifluoromethane)sulfonamide lithium (LiTFSI), LiNO$_3$. The lithium salt is optionally present in a concentration ranging from about 0.1 M to about 2.0 M. When the lithium salt is included at the above concentration range, an electrolyte may have excellent performance and lithium ion mobility due to optimal electrolyte conductivity and viscosity.

An electrochemical cell optionally includes a separator. The separator can be made from, for example, polymers such as polyvinylidene fluoride (PVDF), polyvinylidene fluoride-co-hexafluoropropylene (PVDF-HFP), polyethylene (PE), polypropylene (PP), glass fiber, or similar polymers and inorganic additives such as clays or organically modified clays (e.g., clays including cationically or anionically or chemically modified surface functional group(s)). Other separator materials may also be used.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXAMPLES

Example 1: Sulfur-Metal Nitride Composite Synthesis

An electrochemically active porous TiN structure is produced from anatase TiO$_2$ precursor (Cristal, Woodridge, IL). The TiO$_2$ was stirred at room temperature in 5 weight percent solution of cyanamide in ethanol, and dried at 80° C. for approximately 12 hours. In a subsequent thermal step the additive is decomposed at a temperature above 500° C. for 0.5 to 3 hours to leave a rigid carbon nitride framework that inhibits sintering. Upon raising the temperature to above 650° C. the carbon nitride framework thermally decomposes and is volatilized at the completion of the nitridation operation leaving clean TiN.

The resulting TiN structure is assayed by scanning electron microsopy (SEM) using a JEOL JSM 7001F as per established procedures. The SEM images are illustrated in FIG. 1 and illustrate particles with an average diameter of less than 20 nanometers (nm) and highly porous microstructure with a porosity of 50%.

Figure 2:
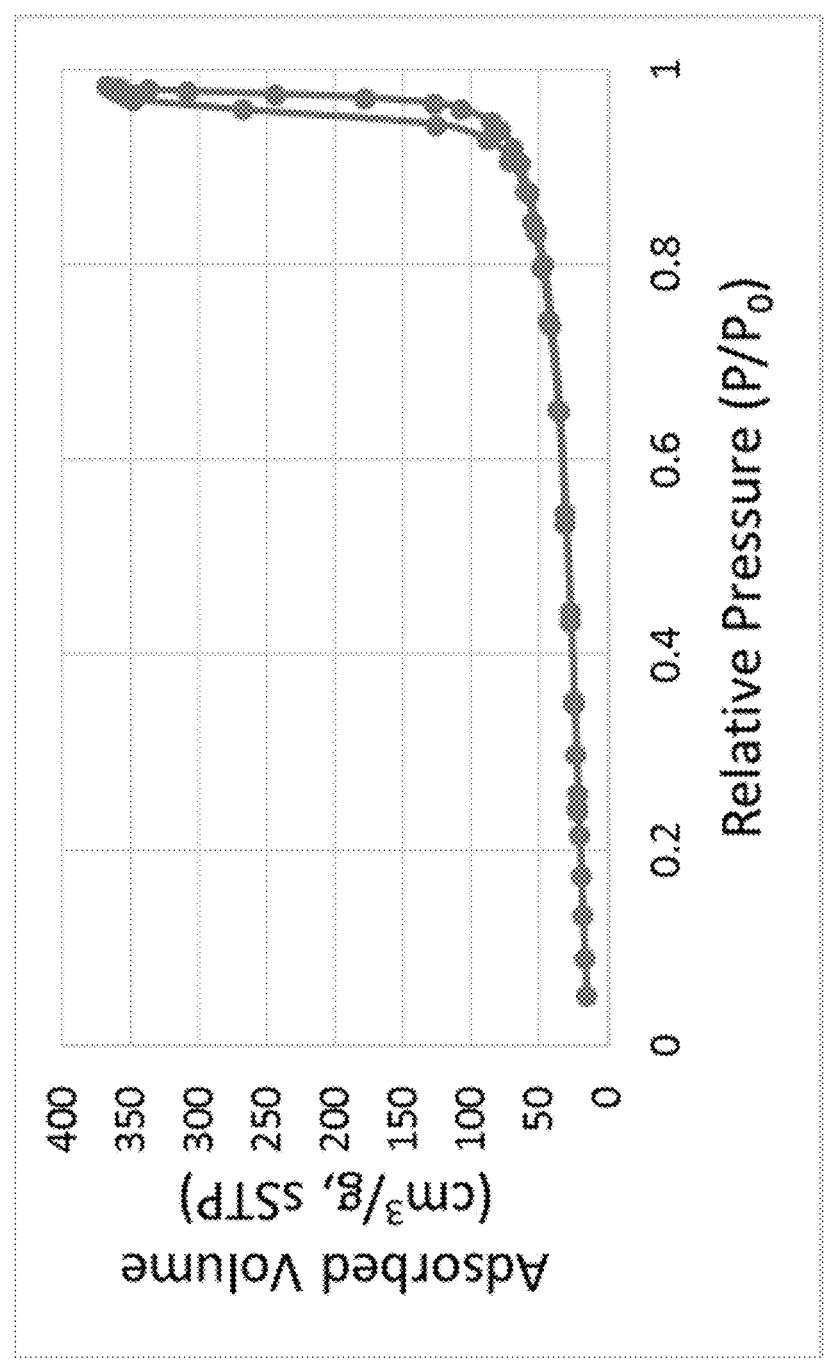
FIG. 2 illustrates the N$_2$ adsorption of an exemplary TiN structure illustrating a mesoporous profile.

Nitrogen adsorption and desorption isotherms for the TiN structure were characterized by nitrogen sorption using a Micrometrics ASAP 2020 physisorption analyzer. BET surface area was calculated. Pore size distributions were derived from the adsorption branches of isotherms using the Barrett-Joyner-Halenda (BJH) model. The resulting isotherm is illustrated in in FIG. 2 illustrating a mesoporous structure.

Figure 3:
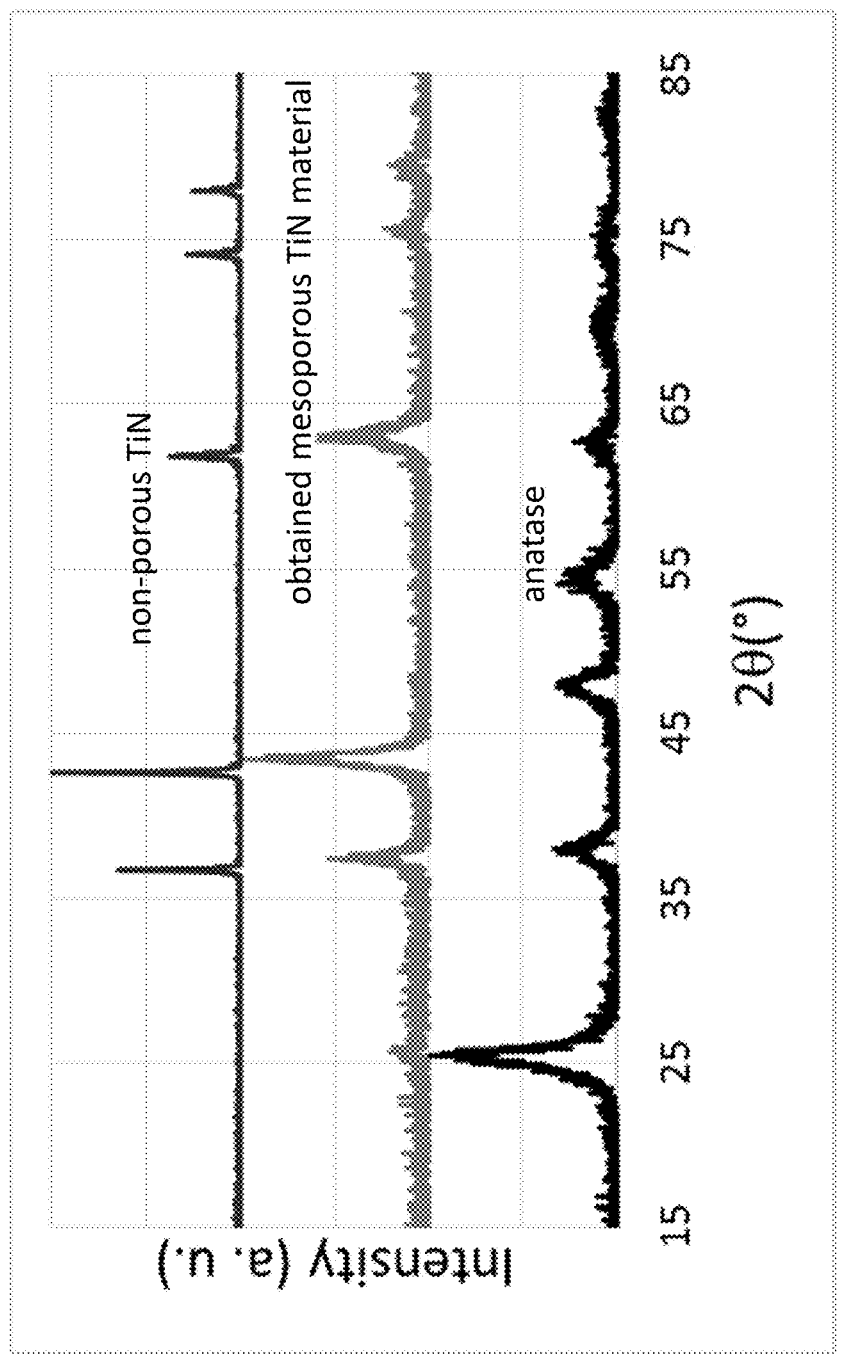
FIG. 3 illustrates XRD profiles of a reference material, an as-received precursor material, and an exemplary electrochemically active TiN material.

Microstructure of the active TiN material was studied by XRD and compared to a reference material (non-porous TiN precursor form American Elements (Los Angeles, CA)) and an as received anatase precursor (American Elements (Los Angeles, CA)). XRD patterns were collected on Philips X'Pert Powder X-Ray diffraction instrument using Cu Kα radiation (λ=1.54 Å), and scan rate was 2 degree/min in the range of 10-90 degrees. The resulting XRD patterns of the three samples are illustrated in FIG. 3.

Example 2

The porous TiN matrix is infused through a melt-diffusion of molten elemental sulfur. Typically, 10~12 g commercial sulfur powders and 10 g porous TiN products may be mixed homogeneously by utilizing Speed Mixer (FlackTek Inc.) at 800 rpm for 5 minutes. The mixture is transferred into a vessel and then sealed under vacuum (<−0.081 MPa). Then, the sealed vessel is placed in the oven and heated to a temperature of 160° C.-180° C., and held at the target temperature overnight. After cooling to room temperature, the sulfur infiltrated TiN powders are ready for further characterization and electrode fabrication. Visual inspection of the material illustrates a black-color representing encapsulation of sulfur in the pores of the TiN structure.

Figure 4:
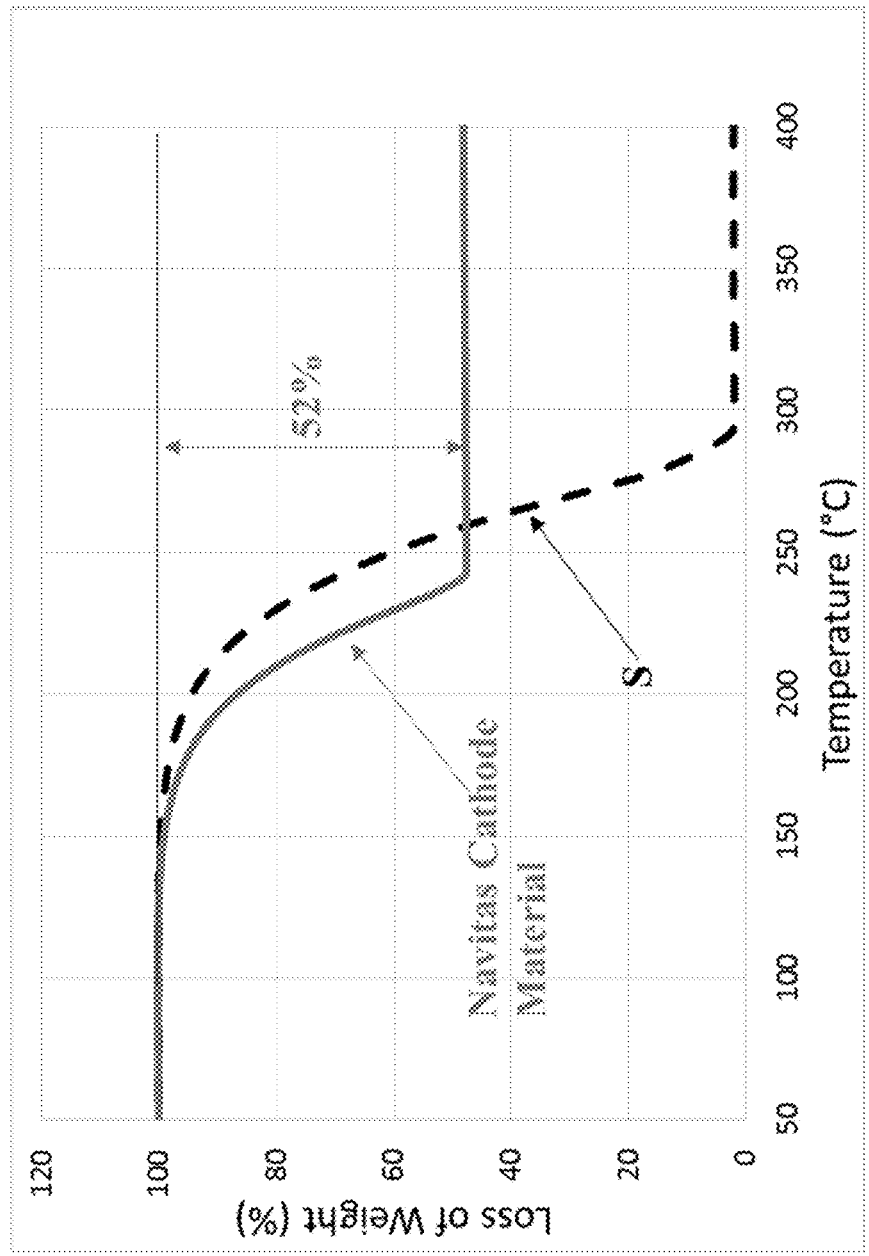
FIG. 4 illustrates TGA analysis of sulfur impregnated TiN material according to one aspect.

The infiltrated TiN powders are analyzed by thermogravimetric analysis (TGA) using a Thermogravimetric Analyzer (TGA Q500, TA Instruments). For TGA analysis, the TiN-sulfur mix is heated under a continuous nitrogen atmosphere at a heating rate of 10° C. min$^{-1}$ from 25° C. to 600° C. The results as illustrated in FIG. 4 indicated a 52 weight percent impregnation of sulfur in the TiN structure. The resulting structures formed had an average diameter of 10 μm.

Example 3: LSB Cathode Fabrication

The active LSB cathode material of Example 2 is be mixed with a conductive carbon (Denka) and a polyvinylidene fluoride (PVdF) binder in N-methyl-2-pyrrolidinone (NMP) at a ratio of 80% sulfur impregnated TiN, 14% carbon, and 6% binder with percentages being percent by weight. The cathode was prepared by dispersion of solid powders in NMP solvent. The mixing conditions are controlled to form a coatable slurry (i.e., viscosity between 1000 to 8000 cPs at 100 rpm). The slurry is hand cast on aluminum foil (200 cm$^2$) to a loading of 0.56 mg/cm$^2$ based on sulfur content. When the electrode is dry, it is calendered to target porosity of 30%.

Figure 5:
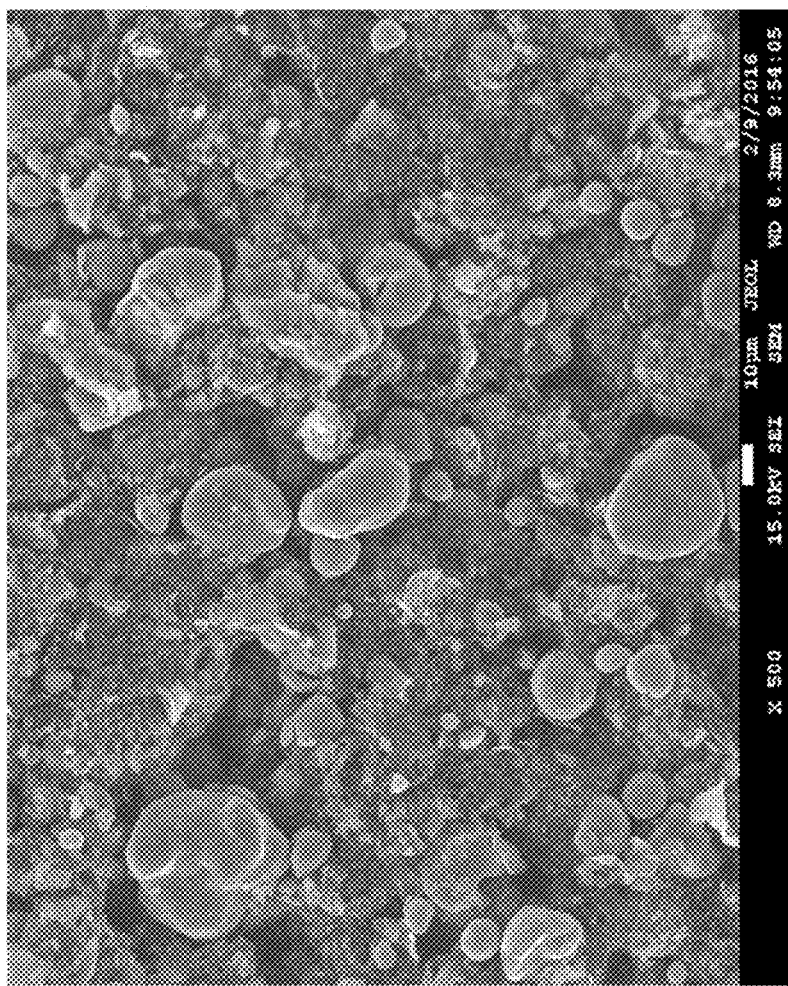
FIG. 5 is an SEM image of an electrode formed using a sulfur impregnated TiN material according to one aspect.

A visual inspection of the resulting electrode indicates a smooth surface without agglomerations. The electrode is subjected to further analysis by SEM as illustrated in FIG. 5. SEM demonstrates uniform dispersion of electrode components throughout the electrode surface.

Example 4: Electrochemical Performance of LSB Cathodes

Cathode formulation and structure were validated in full LSB cells with lithium metal as the counter electrode. 1 M bis-(trifluoromethane)sulfonamide lithium (LiTFSI) in a mixture of 1.3-dioxolane (DOL) and 1,2-dimethoxyethane (DME) (1:1 v/v) was used as the electrolyte. The cell operation voltage for the LSB was 1.5-3.0 V. The sulfur impregnated TiN of Examples 2 and 3 is compared to a mesoporous carbon (Porocarb HD3, Heraeus, Hanau, Germany) as a control and prepared using identical conditions as the TiN.

Figure 6:
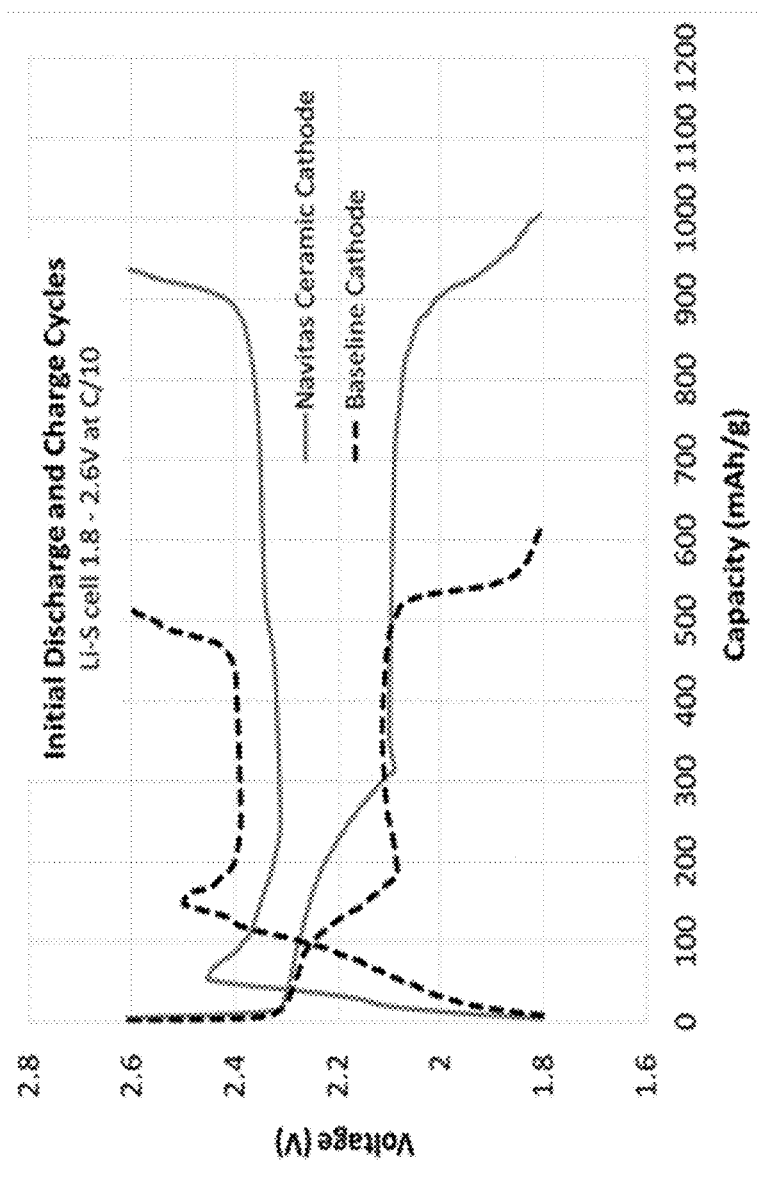
FIG. 6 illustrates the electrochemical performance of an electrode produced according to one aspect illustrating superior performance over porous carbon systems.

The electrochemical performance of the sulfur impregnated TiN material of Example 3 (Navitas Ceramic Cathode)

is illustrated in FIG. 6 demonstrating a much longer plateau at 2.1V relative to mesoporous carbon (baseline cathode) with the plateau extending out to nearly 900 mAh/g specific capacity. The reversible capacity relative to the mesoporous carbon control is illustrated in Table 4 demonstrating a much greater reversible capacity of the exemplary sulfur impregnated TiN material.

TABLE 5

| Sulfur Host | 1st Dis. (mAh/g) | 1st Ch. (mAh/g) | 2nd Dis (mAh/g) |
| --- | --- | --- | --- |
| Control | 1439 | 630 | 565 |
| TiN cathode | 1336 | 994 | 898 |

Capacity and energy are evaluated by first testing cell capacity and energy at low C-rate (C/10) on Maccor automated cycler. Three cells are tested for reproducibility. The specific energy (Wh/kg) is calculated based on the voltage, current, and time of the charge/discharge curves, and weight of the LSB cell. The results are compared with the theoretical capacity and energy. The C/10 capacity and energy are also used as the baseline for subsequent rate capability and cycle life tests.

Figure 7:
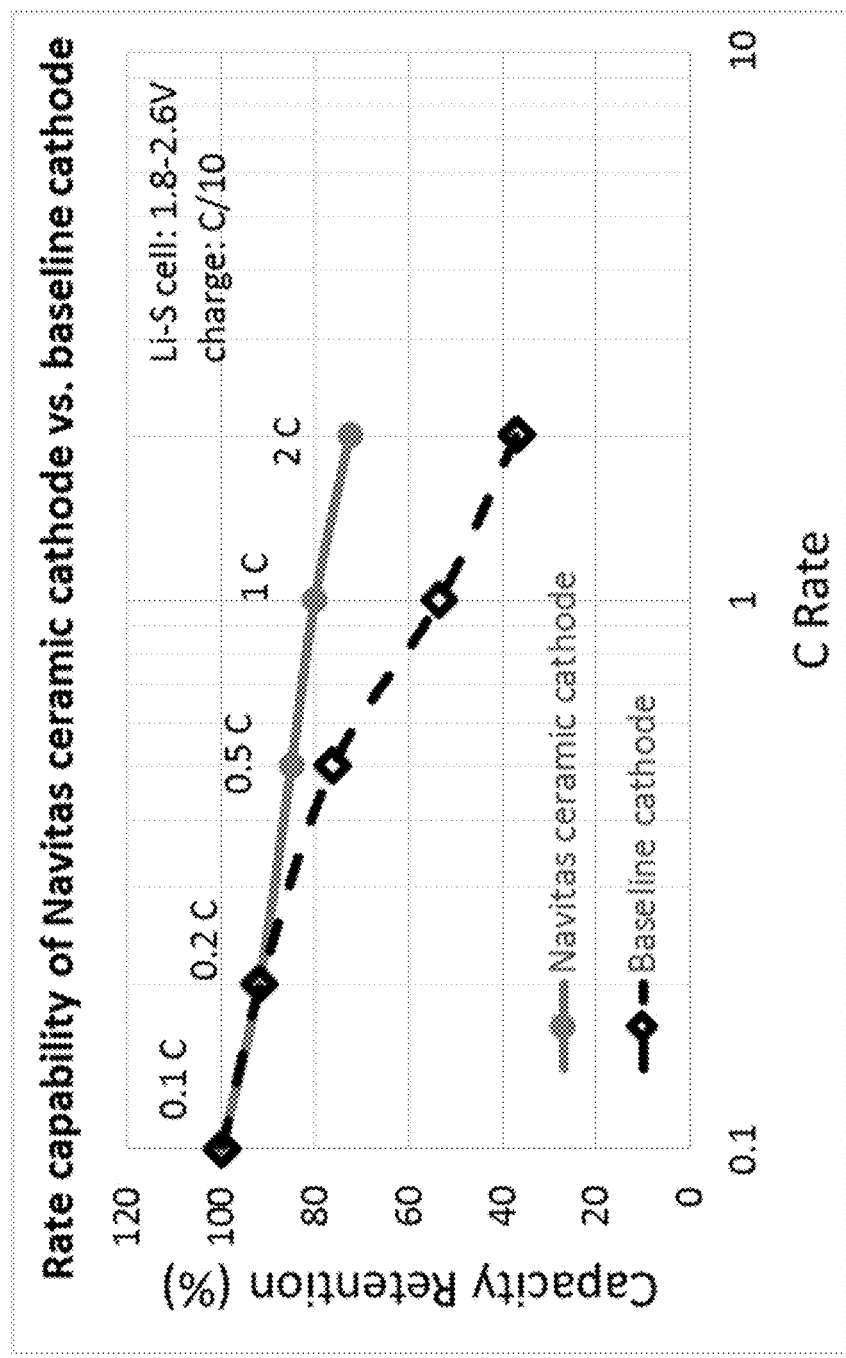
FIG. 7 illustrates charge and discharge capacity of a sulfur impregnated TiN material according to one aspect.

Charge and discharge capacity are measured at incrementally higher C-rates (C/10, C/5, C/2, 1C, and 2C) to evaluate the rate capability. The discharge capacity retention at different C-rates is calculated from the cell capacity at the specific C-rate against that at C/10. The capacity retention relative to the control mesoporous carbon electrode is illustrated in FIG. 7 which illustrates a much improved capacity of the sulfur impregnated TiN cathode material at all C-rates tested above 0.2C. At a 2C rate, the capacity retained is 2 times greater for the sulfur impregnated TiN cathode material than the control.

Figure 8:
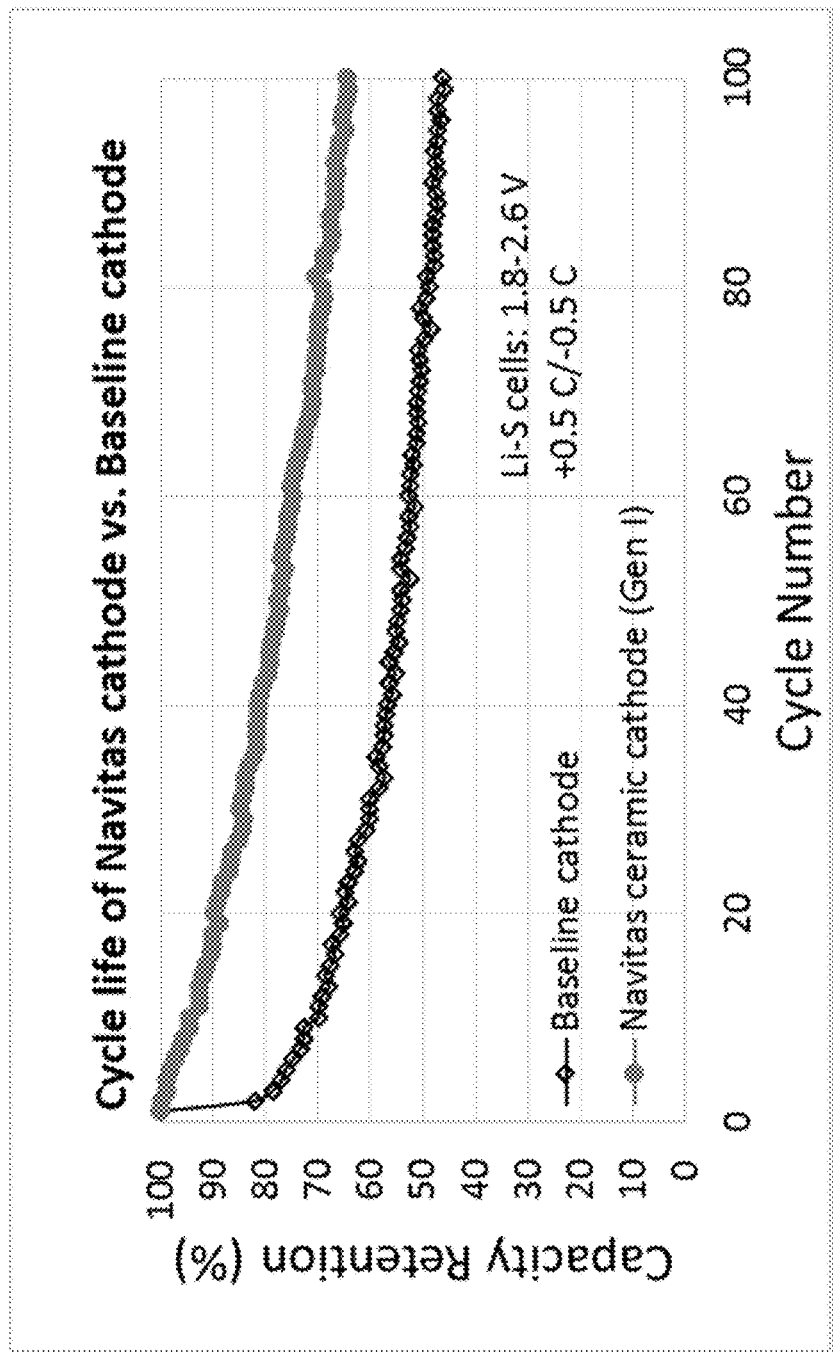
FIG. 8 illustrates the cycle life of a sulfur impregnated TiN material according to one aspect.

Cell cycle life tests were performed at room temperature at a +0.5C/−0.5C rate and results relative to mesoporous carbon control are illustrated in FIG. 8. The initial capacity of the test electrode was 0.39 mAh/cm$^2$ relative to 0.25 mAh/cm$^2$ for the baseline mesoporous carbon electrode. Cycle life of the test electrode was similarly much greater than control with 65% residual capacity at cycle 100 for the test and only 46% residual capacity for the control.

Example 5

A second formulation of LSB cathode material is made using identical conditions of Examples 1-3 but where the 10 micrometer average particle size TiN material of those examples was subjected to ball milling resulting in a material with an average particle diameter of 5 μm for the sulfur impregnated LSB material. Either the 10 micrometer material or the 5 micrometer material was used to form active cathode materials using either PVdF binder as above or prepared by substituting a poly(acrylic acid) (PAA) binder in place of the PVdF binder of Example 3 with other conditions maintained. Test cells were produced and tested as in Example 4 with DSC testing performed using a comparator of LiNi$_{0.5}$Co$_{0.2}$Mn$_{0.3}$O$_2$ as baseline.

Figure 9:
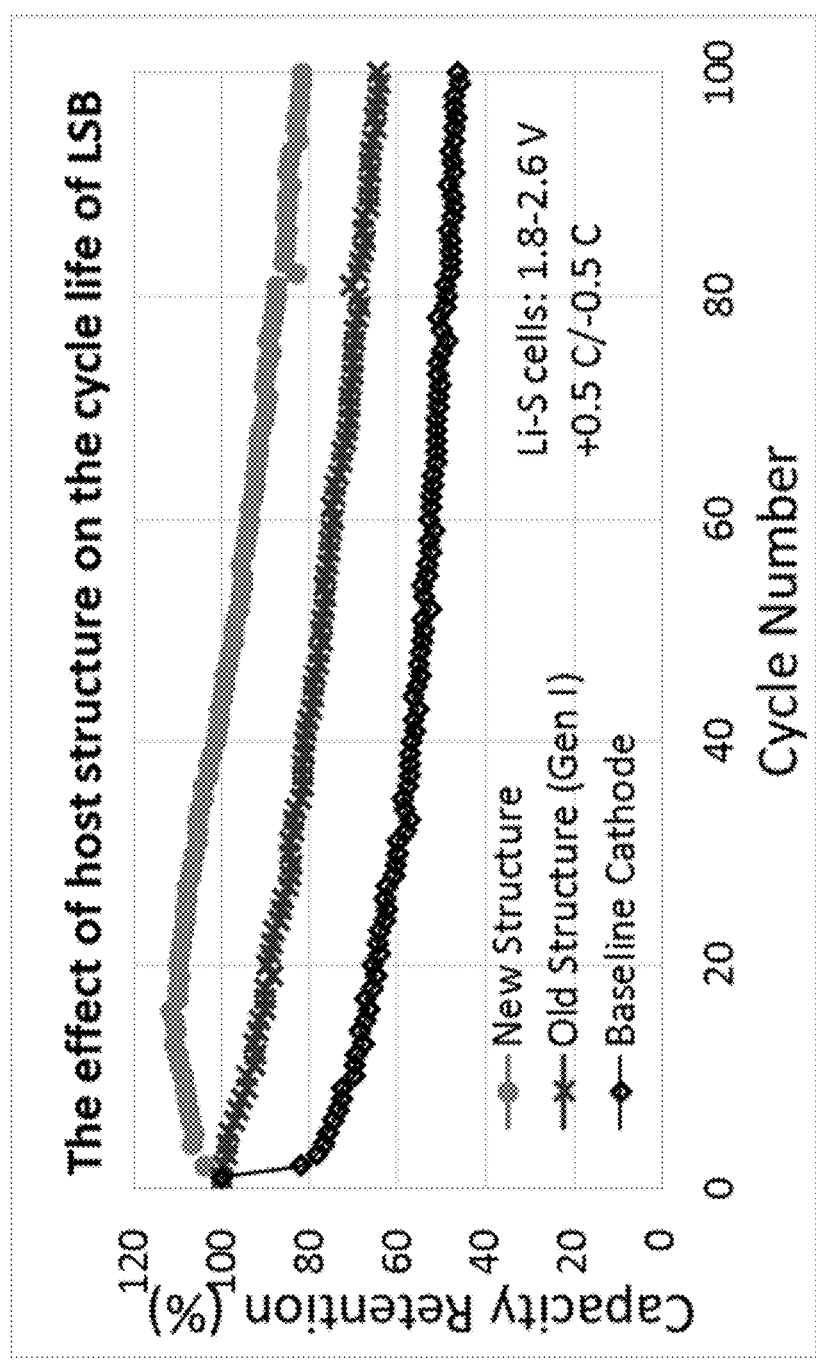
FIG. 9 illustrates cycle life of a TiN material with an average particle size of 5 micrometers (new structure) relative to TiN material with a 10 micrometer average particle size (Gen I) and relative to a baseline porous carbon material each using PVdF as a binder.

FIG. 9 illustrates that when the average particle size is reduced from 10 micrometers to 5 micrometers using the same binder material a much improved cycle life is achieved with excellent capacity maintained out to 40 cycles and beyond.

Figure 10:
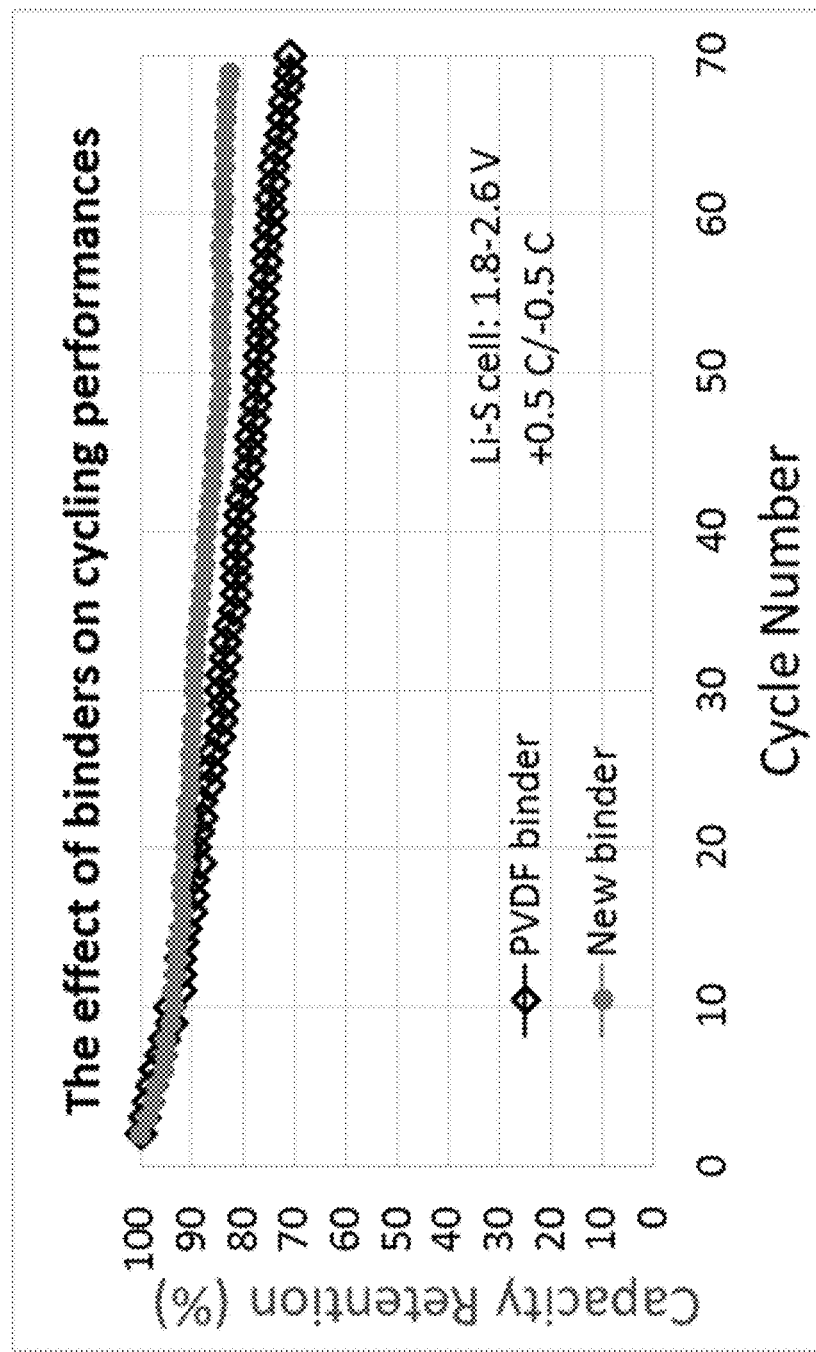
FIG. 10 illustrates cycle life of a 10 micrometer average particle size TiN electrode active material with either a PVDF binder (PVDF binder) or when used with a PAA binder (New binder)

When PAA is substituted for PVdF as a binder material and the TiN material is of the same particle size (10 micrometers) the use of PAA as a binder results in superior electrochemical performace and increased cycle life reducing at a much lower rate relative to the PVdF binder material as illustrated in FIG. 10.

Figure 11:
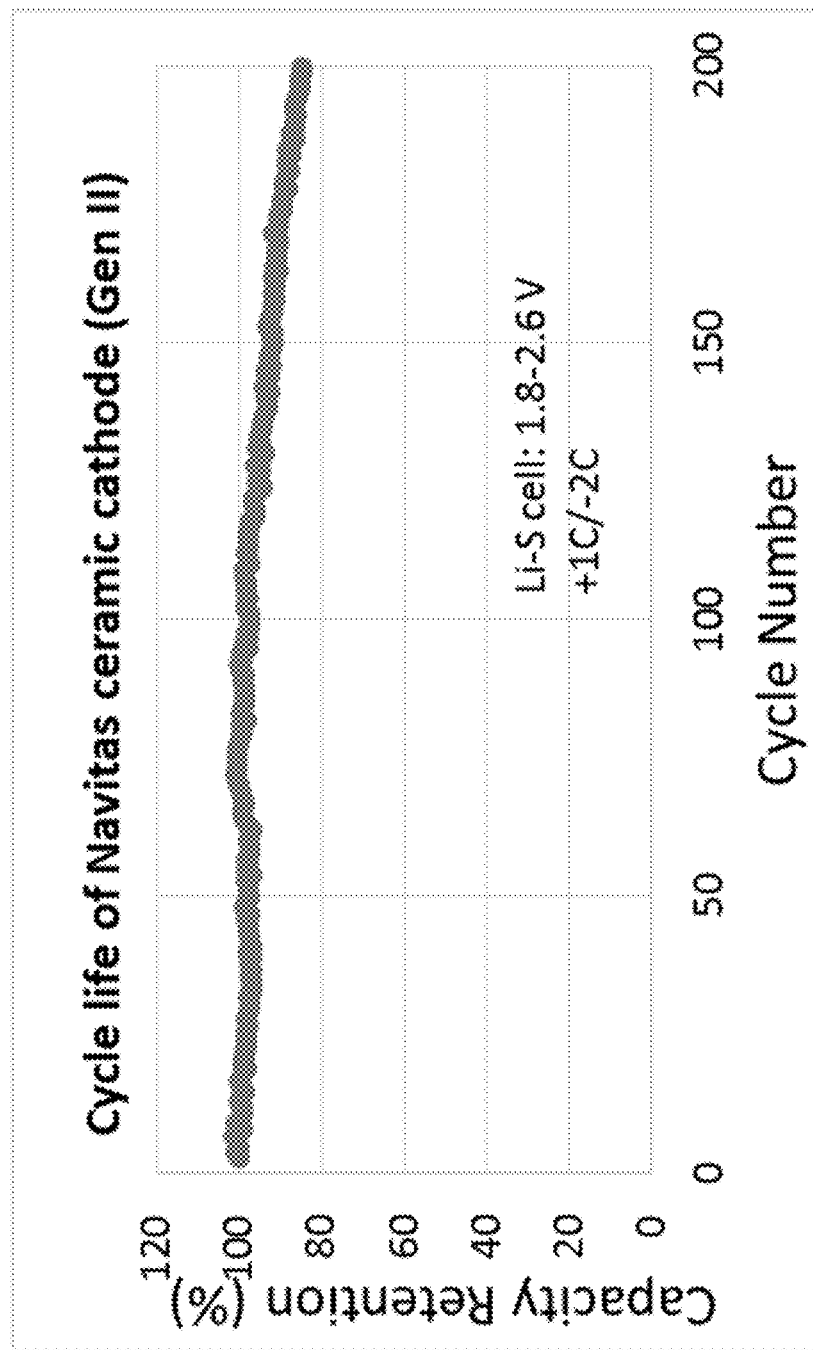
FIG. 11 illustrates cycle life of an electrode incorporating an active material based on a 5 micrometer average particle size TiN material combined with a PAA binder.

FIG. 11 illustrates excellent cycle life of a material formed from a 5 micrometer average particle size TiN material when combined with a PAA binder illustrating highly superior characteristics and very little capacity loss at 100 cycles with greater than 80% residual capacity at 200 cycles.

Example 6

The electrode material of Example 3 is compared to electrode material prepared the same way but substitution NCM 523 for the LSB material for safety. Safety and abuse tolerance of the Si composite anodes were performed by differential scanning calorimetry (DSC). DSC enables the thermal response of individual and selected combinations of cell components to be measured over a broad temperature range. DSC allows qualitative measurements of the local charge state of the electrodes, which impacts the cell thermal reactivity leading to cell thermal runaway as well as cell self-discharge.

DSC measurements were made for the material of Example 3 and compared to NCM based electrodes. Measurements were made on disassembled cells as well as laboratory half-cells enabling detailed characterization of individual electrode changes under controlled conditions. After formation, the cells were taken to full charge and disassembled inside an argon-filled glovebox, the electrodes were harvested and transferred and hermetically sealed in DSC pans. The sealed pan was transferred to a TA DSC Q200 instrument for DSC analysis. DSC measurements were performed under $N_2$ at 30° C.-400° C. with a heating rate of 5° C./min.

Figure 12:
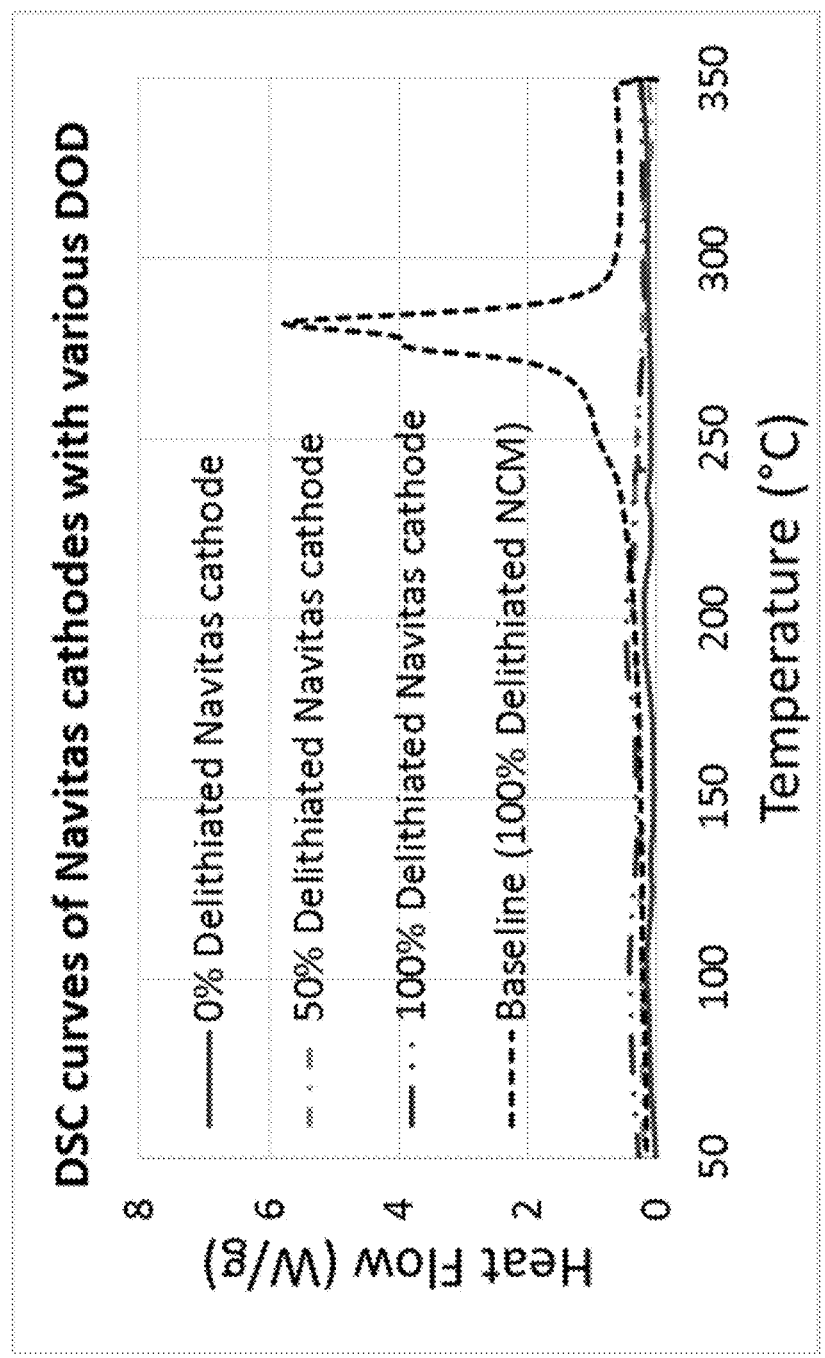
FIG. 12 illustrates DSC measurements of and electrode active material based on a 10 micrometer average particle size with a PVdF binder relative to NCM control (baseline) illustrating little to no heat evolution and improved safety.

FIG. 12 illustrates the expected large temperature release from the NCM electrode. However, the LSB cathodes demonstrated no heat evolution and demonstrating greatly improved safety.

Similar results may be obtained using other metal oxides, metal nitrides, or metal oxynitrides to coat a porous substrate (s) optionally followed by reduction and nitridation of the resulting materials.

Overall, the porous ceramic cathode materials provided herein represent low cost, highly conductive, stable, and possess high affinity to both sulfur and polysulfides. This novel cathode addresses the limitations of the current sulfur cathode materials and enable the high sulfur loading that is required to meet EV battery energy density and cycle life targets.

Reference Listing

Evers, S., Yim, T., Nazar, L. F., "Understanding the Nature of Absorption/Adsorption in Nanoporous Polysulfide Sorbents for the Li-S Battery", *J. Phys. Chem. C.*, 116, 19653-19658, (2012).

Fu, Y. Z. and Manthiram, A., "Enhanced Cyclability of Lithium-Sulfur Batteries by a Polymer Acid-Doped Polypyrrole Mixed Ionic-Electronic Conductor", Chem. Mater., 24, 3081-3081 (2012).

Jayaprakash, N., et al, "Porous Hollow Carbon at Sulfur Composites for High-Power Lithium-Sulfur Batteries", *Angew. Chem. Int. Ed.*, 5, 5904-5908 (2011)

Ji, L., et al., "Graphene Oxide as a Sulfur Immobilizer in High Performance Lithium/Sulfur Cells", J. Am. Chem. Soc., 133, 18522-18525 (2011)

Ji, L. W., et al., "Porous Carbo Nanofiber-Sulfur Composite Electrodes for Lithium/Sulfur Cells", *Energy Environ. Sci.*, 4, 5053-5059 (2011)

Ji, X., Lee, K. T., Nazar, L. F., "A highly ordered nanostructured carbon-sulphur cathode for lithium-sulphur batteries", *Nat. Mater.*, 8, 500-506, (2009).

Manthiram, A., Fu, Y., Su, Y., "Challenges and Prospects of Lithium-Sulfur Batteries", *Accounts of Chemical Research*, 46, 1125-1134, (2013).

Manthiram, A., Fu, Y., Chung, S., Zu, Ch., Su, Y., "Rechargeable Lithium-Sulfur Batteries", *Chem. Rev.*, 114, 11751-11787, (2014).

Qiu, Y., et. al., "High-Rate, Ultralong Cycle-Life Lithium/Sulfur Batteries Enabled by Nitrogen-Doped Graphene", *Nano Lett.*, 14, 4821-4827 (2014).

Schuster, J., et al, "Spherical Ordered Mesoporous Carbon Nanoparticles with High Porosity for Lithium-Sulfur Batteries", *Angew. Chem. Int. Ed.*, 51, 3591-3595 (2012)

Song, J., Xu, T., Gordin, M., Zhu, P., Lv, D., Jiang, Y., Chen, Y., Duan, Y., Wang, D., "Nitrogen-Doped Mesoporous Carbon Promoted Chemical Adsorption of Sulfur and Fabrication of High-Areal-Capacity Sulfur Cathode with Exceptional Cycling Stability for Lithium-Sulfur Batteries", *Adv. Funct. Mater.*, 24, 1243-1250, (2014).

Song, M. S., et. al., "Effects of Nanosized Adsorbing Material on Electrochemical Properties of Sulfur Cathodes for Li/S Secondary Batteries", *J. Electrochem. Soc.* 151, A791-A795 (2004).

Wu, F., et. al., "Sulfur/Polythiophene with a Core/Shell Structure: Synthesis and Electrochemical Properties of the Cathode for Rechargeable Lithium Batteries", *J. Phys. Chem. C*, 115, 6057-6063 (2011).

Yang, Y., Zheng, G., Cui, Y., "Nanostructured Sulfur cathodes", *Chem. Soc. Rev.*, 42, 3018-3032, (2013).

Zhang, B., Qin, X., Li, G. R., and Gao, X. P., "Enhancement of Long Stability of Sulfur Cathode by Encapsulating Sulfur into Micropores of Carbon Spheres", *Energy Environ. Sci.*, 3, 1531-1537 (2010).

Zhang, Z., Li, Q., Lai, Y., and Li, J., "Confine Sulfur in Polyaniline-Decorated Hollow Carbon Nanofiber Hybrid Nanostructure for Lithium—Sulfur Batteries", J. Phys. Chem. C, 118, 13369-13376 (2014).

Zheng, G., Yang, Y., Cha, J. J., Hong, S. S., and Cui, Y., "Hollow Carbon Nanofiber-Encapsulated Sulfur Cathodes for High Specific Capacity Rechargeable Lithium Batteries", *Nano Lett*, 11, 4462-4467 (2011).

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

We claim:

1. An electrode comprising:
an electrically conductive porous particle forming an electrochemically active material, said electrically conductive porous particle comprising a metal nitride or metal oxynitride comprising a structure formed by heating the metal under anhydrous $NH_3$ gas flow, said structure infiltrated with sulfur such that the sulfur is encapsulated into pores of the electrically conductive porous particle, wherein the metal in said metal nitride or metal oxynitride comprises a transition metal, wherein said metal nitride or metal oxynitride is electrically conductive.

2. The electrode of claim 1 further comprising a binder wherein said binder comprises polytetrafluoroethylene, polyvinylidene difluoride, latex binder, carboxymethylcellulose, poly (acrylic acid), polyvinyl alcohol, or combinations thereof.

3. The electrode of claim 1 further comprising one or more electrically conductive fillers.

4. The electrode of claim 3, wherein said electrically conductive filler comprises carbon.

5. The electrode of claim 4, wherein said carbon is carbon black, carbon nanotube, carbon nanofiber, synthetic graphite including expanded graphite, graphite nanosheet, graphite nanoplatelet, graphene sheet, non-synthetic graphite (including natural graphite and coke), graphitized carbon nanofiber, or combinations thereof.

6. The electrode of claim 1, wherein said metal nitride or metal oxynitride mixes with porous carbon.

7. The electrode of claim 6, wherein said metal nitride or metal oxynitride coats a surface of said porous carbon.

8. The electrode of claim 1, wherein said metal is selected from the group consisting of Ti, Cr, Fe, Mo, W, Co, Nb, Ni, and combinations thereof.

9. The electrode of claim 8, wherein said metal is selected from the group consisting of Ti.

* * * * *